INVENTORS
ROBERT A. REDARD
ANTOINE FROMAGEOT
BY
Robert Harding Jr.
ATTORNEY

INVENTORS
ROBERT A. REDARD
ANTOINE FROMAGEOT
BY Robert Harding Jr.
ATTORNEY

INVENTORS
ROBERT A. REDARD
ANTOINE FROMAGEOT
BY Robert Harding Jr.
ATTORNEY

Patented Jan. 30, 1951 2,539,474

UNITED STATES PATENT OFFICE 2,539,474

TRANSMISSION OVER CABLES BY MEANS OF FREQUENCY MODULATION

Robert Alfred Redard and Antoine Fromageot, Paris, France, assignors to International Standard Electric Corporation, New York, N. Y., a corporation of Delaware Application August 5, 1947, Serial No. 766,416
In France May 23, 1945

Section 1, Public Law 690, August 8, 1946
Patent expires May 23, 1965

14 Claims. (Cl. 178—44)

The present invention relates to a system for the transmission of multiplex communications by cable that employs a carrier wave modulated in frequency by the frequency band that represents the multiplex signals.

At the transmission end, the frequency band to be transmitted that proceeds either directly from the transmitting apparatuses or indirectly through the intermediary of a frequency changing device is employed to modulate in frequency a carrier wave of a frequency much higher than the one to be transmitted over the cable, e. g. 50 megacycles per second, then by frequency changing, the carrier wave is brought back to 3 megacycles per second, for example, the frequency excursion remaining the same, and this last signal of suitable frequency being transmitted over the cable.

The frequency band to be transmitted has really to be of as low a value as possible in order to produce a relatively weak attenuation while having such a ratio of extreme frequencies that all inter-channel cross-talk is prevented.

At the receiving end, the frequency modulated wave of 3 megacycles per second is brought by conversion to a higher valve, e. g. 20 megacycles per second, and the operation of amplification and demodulation then effected on this wave by means of known devices; in particular, the output of the demodulator provided with a low-pass filter acts on the local oscillator employed in the conversion, so as to control its frequency.

The main advantage of these frequency changes is that of making it possible to effect the frequency modulation and demodulation operations on carrier waves having values that are particularly suitable for these operations, while at the same time transmitting a frequency band adapted to the conditions for propagation over the cable.

One of the improvements comprised in the invention consists in doubling the normal excursion of a frequency modulating circuit in the following manner.

If $F_o$ is the high carrier frequency that is capable of a variation $\Delta F$ under the action of the modulating voltage, the modulated voltage $F_o + \Delta F$ is combined with a local voltage of the frequency $F_o \pm F_1$ so as to finally obtain in the band $F_1 + \Delta F$ a signal that is transmitted over the cable.

In the circuit according to the invention there are set up two frequency modulators at the respective carrier frequencies $F_o$ and $F_o + F_1$, these being modulated by the signal in phase opposition so as to give rise at the output to voltages in the respective frequency bands $F_o \pm \Delta F$ and $F_o \pm \Delta F$; these two combined signals will finally give a band $\pm 2\Delta F$ around the frequency $F_1$.

These features as well as others are explained in detail in the following description, which is given by way of example without limitation and with reference to the appended drawings, in which Fig. 1 is a schematic of an embodiment of a transmission system according to the invention.

Figure 1:
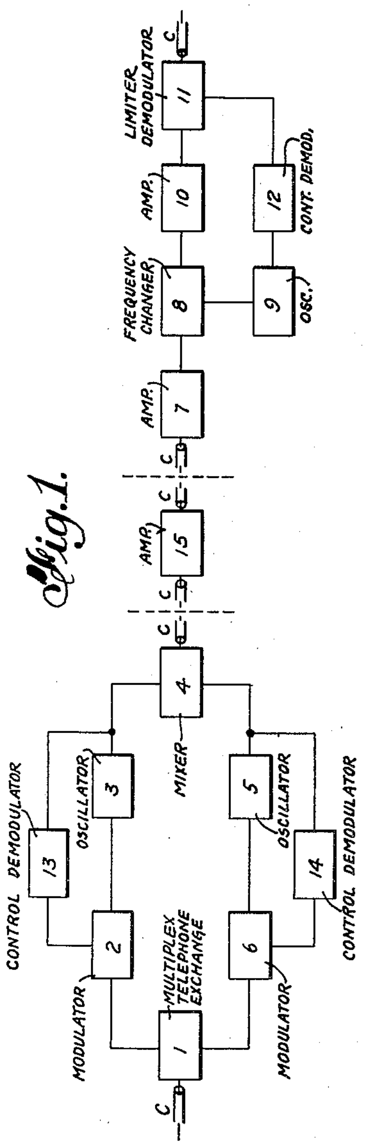

In Fig. 1, the signals transported over cable C and proceeding from the multiplex telephone equipment 1 are applied to circuit 2, the characteristics of which they modify so as to modulate in frequency oscillator which is operating at $F_o$. A mixing circuit 4 receives the signals of frequency $F_o \pm \Delta F$ proceeding from 3 and those of a local oscillator 5 of frequency $F_o + F_1$ modulated by 1, i. e. of frequency $F_o + F_1 \mp \Delta F$, through the intermediary of modulating circuit 6.

At the output of mixer 4, the signals of frequency $F_1 \pm 2\Delta F$ are forwarded over cable C through the intermediary of tandem amplifiers 15.

At the receiving end of cable C, the signals are amplified in 7 and are then converted in frequency by the frequency changer 8 under the action of the local oscillator 9 operating at the frequency $F_2 + F_1$.

At the output of circuit 8, the signals are located in the frequency band $F_2 \pm 2\Delta F$. They are amplified in circuit 10, and are then limited and demodulated by circuit 11, and the initial modulation is restored.

In order to effect a suitable coincidence of the central frequencies of circuits 10 and 11, the frequency $F_2 + F_1$ of the oscillator is, through the intermediary of a control circuit 12, placed under the control of the output voltage of the demodulator incorporated in 11, so as to establish an automatic frequency control.

Similar devices comprising a control demodulator may be added at 13 and 14 respectively to modulators 3 and 5 of the transmitting equipment in such a way as to control the modulation and stabilize the central frequency of each band.

Figure 2:
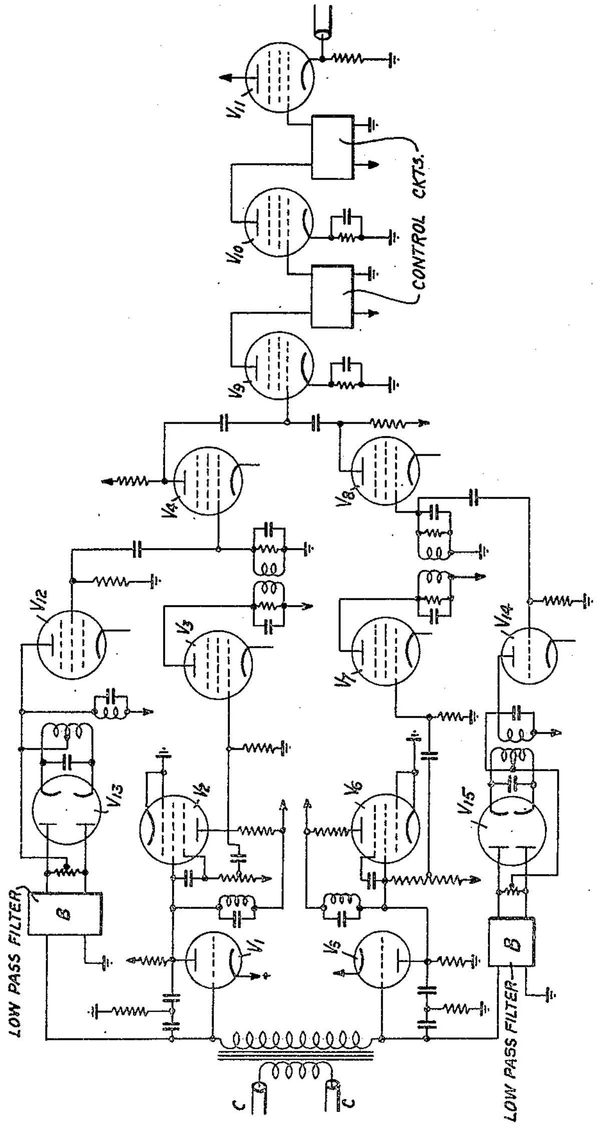
Fig. 2 is a schematic of transmitting circuits.

In the embodiment shown in Fig. 2, the multichannel telephone signals forwarded over cable C are applied symmetrically, by means of an input transformer, to the grids of two "reactance tubes" $V_1$ and $V_5$ disposed in parallel in the oscillatory circuits of the respective oscillators $V_2$ and $V_6$, shown here as "transitrons."

The frequency modulated output voltages of $V_2$ and $V_6$ are applied through the intermediary of the respective amplifiers $V_3$, $V_4$, and $V_7$, $V_8$ to the grid of mixer $V_9$ followed by amplifier stages $V_{10}$ and $V_{11}$; this latter, which has its output circuit in the cathode, being a coupling stage for cable C.

The output of amplifier $V_3$ is also applied to the $V_{12}$, $V_{13}$ assembly which constitutes a demodulator that has its output connected to the grid of tube $V_1$ through the intermediary of a low-pass filter B that only leaves the very low frequency components in order to effect an automatic frequency control.

A similar control device $V_{14}$, $V_{15}$ is employed for stabilizing the central frequency of oscillator $V_6$.

Figure 3:
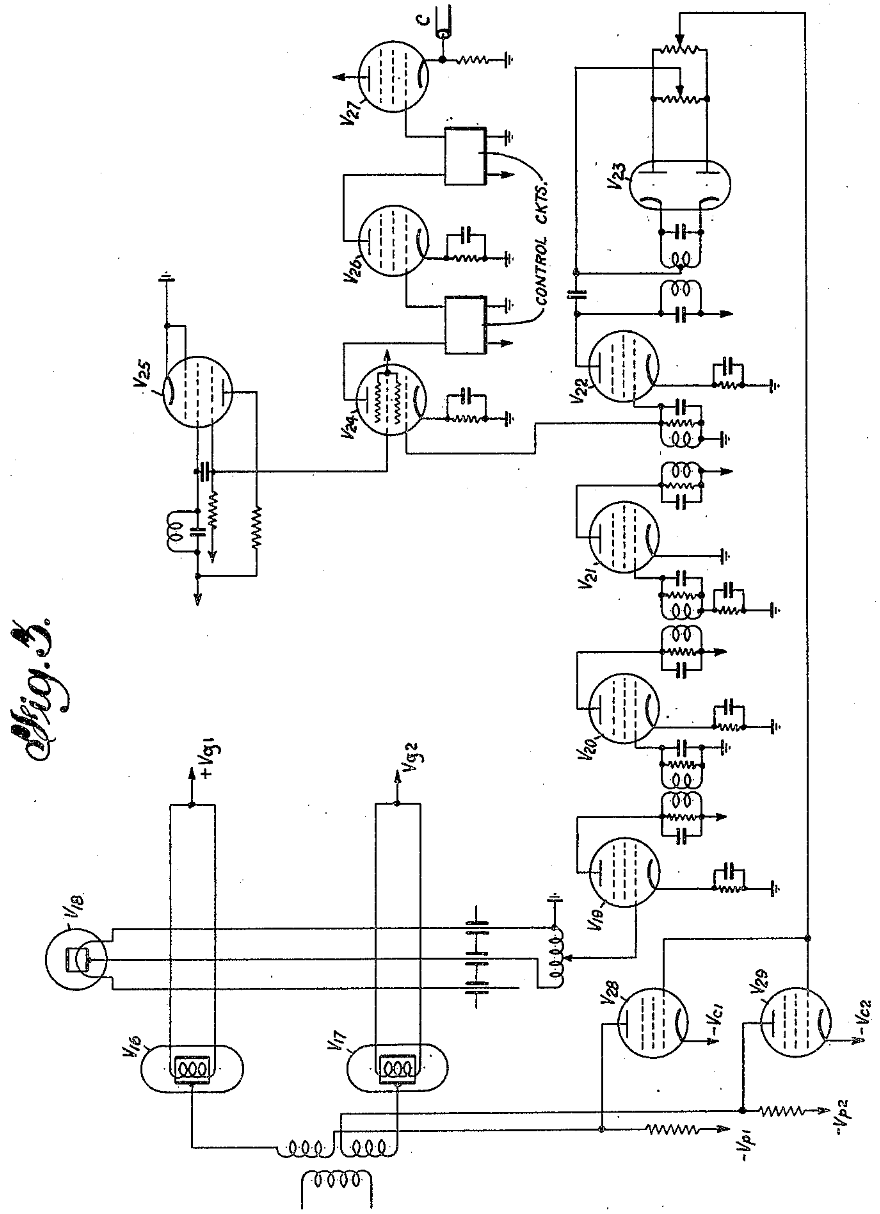
Fig. 3 is another schematic of transmitting circuits.

In the embodiment shown schematically in Fig. 3, the modulation signals are simply applied in series with the respective anode feeds of two positive grid oscillating tubes $V_{16}$ and $V_{17}$ so as to modulate them in frequency.

Regulation of the central frequencies of $V_{16}$ and $V_{17}$ is effected by adjustment of the anode voltage.

The mean frequency voltage of the two oscillators is collected in a mixing circuit comprising a diode connected to a line which is itself coupled to the two grid lines of tubes $V_{16}$ and $V_{17}$. This voltage, when amplified by stages $V_{19}$ and $V_{20}$, is applied to limiter $V_{21}$ which suppresses all amplitude modulation. Limiter $V_{21}$ is connected to mixer $V_{24}$, and also to the demodulating circuit $V_{22}$, $V_{23}$.

The output of this demodulator is connected to amplifier $V_{28}$ and $V_{29}$ whose respective anode circuits are disposed in series with the half-secondaries of the modulation transformer so as to obtain simultaneously a stabilization of the central frequency and a "negative feed-back" of frequency that reduces distortions.

The mixer $V_{24}$, here of the hexode type, is subjected to the action of a local oscillator $V_{25}$, and its output circuit is connected to the amplifier stages $V_{26}$ and $V_{27}$, the latter being a coupling stage for the cable.

Figure 4:
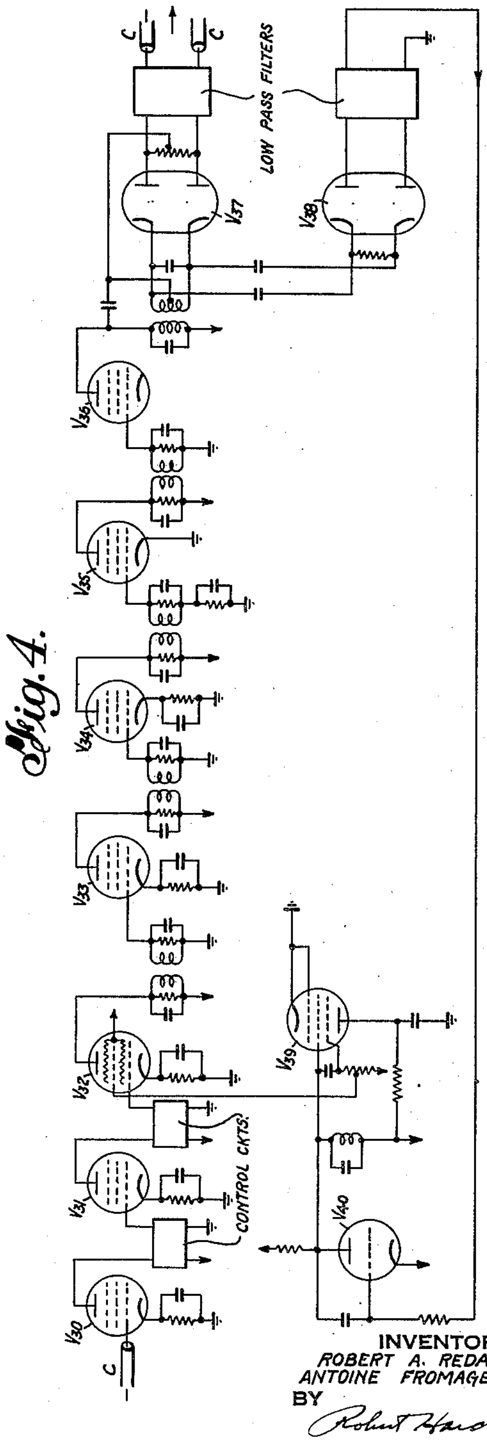
Fig. 4 is a schematic of the circuits employed at the receiving end.

Fig. 4 shows an example of a receiving circuit.

The voltage transmitted by cable C is amplified by stages $V_{30}$ and $V_{31}$, and is then applied to modulator $V_{32}$, shown as a hexode and subjected to the voltage of the local oscillator $V_{39}$.

At the output of $V_{32}$ there is disposed a high intermediate frequency amplifier comprising the stages $V_{33}$ and $V_{34}$ followed by an amplitude limiter $V_{35}$. The output of this limiter is connected to a demodulator assembly consisting of stage $V_{36}$, the anode circuit of which comprises a discriminating circuit connected to the two double detectors $V_{37}$ and $V_{38}$.

The initial modulation is restored by the output of $V_{37}$, which is provided with a low-pass filter $B_1$ that eliminates the intermediate frequency.

The output of $V_{38}$ may be provided with a low-pass filter $B_2$ that only leaves the very low frequencies, and it is applied to the grid of a "reactance tube" $V_{40}$ that acts on the frequency of local oscillator $V_{39}$; by this means there obtained an automatic centering of the intermediate frequency with the central frequency of the discriminator. It may also be provided with a filter like the one that follows tube $V_{37}$ and, by the control of $V_{40}$ and $V_{39}$, furthermore effect a frequency "negative feed-back."

The field of application of the present invention is not limited to the particular embodiments explained above by way of example without limitation; on the contrary it extends to all other applications, as well as to all variants employing the same features, methods, devices, objects or means.

What we claim is:

1. System for transmitting high frequency signals over a line at a frequency such that the line produces a weak attenuation, comprising a first source of carrier waves of a frequency too high to be effectively transmitted over said line, a second source of high frequency carrier waves of frequency different from the waves from said first named source, means to separately frequency modulate said high frequency waves of said first and second sources by the signals to be transmitted, means to combine said separately modulated waves to derive a reduced frequency carrier wave so modulated as to at least maintain the original extent of the signal frequency excursions, means for impressing the modulated wave of reduced carrier frequency on said line and receiving means including means for stepping up the carrier frequency and demodulating the signal therefrom.

2. System according to claim 1 wherein said combined frequency modulation products include a double frequency normally produced by one of said means for modulating.

3. Method of transmitting signals over a line producing large attenuation of high frequency signals, comprising frequency modulating the signals to be transmitted on to separate high frequency carrier waves of different frequency, combining said separately modulated carrier waves to derive modulated carrier frequency waves of substantially reduced frequency maintaining the extent of the normal frequency excursion, transmitting said reduced frequency wave over said line, receiving and raising the carrier frequency of said last named waves and demodulating the same to reproduce the signal.

4. Method according to claim 3 wherein the modulating includes frequency modulating in phase opposition both of said high frequency carrier waves differing in frequency from each other by a frequency equal to said reduced frequency, mixing said modulated high frequency waves to produce a modulated frequency band around said reduced frequency of double the normal width.

5. System according to claim 1, wherein the modulating means includes two frequency modulators using carrier waves of the respective frequencies $F_0$ and $F_0+F_1$, means to frequency modulate by the signal $\Delta F$ said carriers in phase opposition, and means to combine these signal modulations to give a frequency band of $2\Delta F$ around the frequency $F_1$.

6. System according to claim 5, including oscillation generators of the retarding field negative transconductance type, each having a reactance tube connected in parallel with the oscillatory circuit of its generator, and means coupling the modulating signals to said reactance tubes in phase opposition.

7. System according to claim 6, wherein each modulator includes a control means for modulation and stabilization of the mean frequency comprising a back coupling from the modulator output to the reactance tube having a demodulator and low-pass filter therein.

8. System according to claim 5 including oscillation generators of the retarding field positive grid type, having anode feed circuits, means feeding the modulating signals in series with the respective anode feeds, and a mixing circuit including a diode with means for coupling it to the lines of the positive grids.

9. System according to claim 8, including a limiter coupled to said diode mixing circuit to suppress amplitude modulation, a frequency changing device coupled to said limiter, and means coupling the output of said frequency changing device to the transmission line.

10. System according to claim 8, including in tandem connection from said diode mixer circuit a limiter, a demodulator and a feed-back circuit coupled in parallel to the said anode feed lines.

11. A signal translating system, comprising two sources of high frequency oscillations of different frequency, means for separately frequency modulating the oscillations of each of said sources by a signal, means for combining said separately modulated oscillations for deriving a lower frequency carrier wave containing the frequency modulation band without diminution in width.

12. A system according to claim 11, wherein the modulating means includes two channels coupled to a mixer circuit, the high frequency sources for the respective channels differ in frequency by an amount equal to said lower frequency, and means for connecting the signal to modulate said sources in phase opposition.

13. System according to claim 1, including at the receiver a modulating device comprising a high frequency carrier wave oscillator, a modulating tube supplied with energy from said oscillator and the received wave, thereby producing a high intermediate frequency wave, including also an amplitude limiter coupled to receive the said high frequency wave from said modulator and means for demodulating the output wave from the limiter to reproduce the signal.

14. System having a receiver according to claim 13, wherein the demodulator includes a further unit feeding a low pass filter and there is a reactance tube connected in parallel with the oscillation circuit of said oscillator, together with coupling between said filter and said reactance tube.

ROBERT ALFRED REDARD.
ANTOINE FROMAGEOT.

REFERENCES CITED

The following references are of record in the file of this patent:

UNITED STATES PATENTS

| Number | Name | Date |
|---|---|---|
| 1,754,878 | Clement | Apr. 15, 1930 |
| 2,034,738 | Beverage | Mar. 24, 1936 |
| 2,164,032 | Day | June 27, 1939 |
| 2,264,608 | Armstrong | Dec. 2, 1941 |
| 2,284,415 | Goldstine | May 26, 1942 |
| 2,421,727 | Thompson | June 3, 1947 |